United States Patent Office 3,382,295
Patented May 7, 1968

3,382,295
BLEND OF AMORPHOUS POLYESTERS AS FLUIDIZED BED COATING MATERIAL
Charles W. Taylor, Jr., Akron, and Daniel T. Conrad, Cuyahoga Falls, Ohio, assignors to The Goodyear Tire & Rubber Company, Akron, Ohio, a corporation of Ohio
No Drawing. Filed Aug. 12, 1963, Ser. No. 301,598
8 Claims. (Cl. 260—860)

ABSTRACT OF THE DISCLOSURE

The present invention provides a polyester coating suitable for fluidized bed coating which is a fused blend of at least two linear, amorphous, copolyester resins having different thermal characteristics, i.e., one copolyester having a high glass transition temperature of from 40° C. to about 120° C., the other having a low glass transition temperature of from about −50° C. to 40° C., the difference in the glass transition temperatures of the polyesters being at least 15° C.

---

This invention relates to protective coating materials. More particularly, the invention relates to materials for use in solventless coating processes and to coated products It is an object of the present invention to provide materials which form excellent protective and decorative surfaces. It is another object to provide coatings which can be applied directly to the surface of articles without using a volatile solvent or thinner. It is another object to provide coated articles. Other objects will be apparent from the description of the invention.

Thermoplastic polyester resins have been suggested as coatings for various surfaces, particularly metals of various kinds and wood. The polyester protective coatings used in the known processes consisted of a layer of a particular polyester or copolyester or of two or more layers of particular polyester resins, one of which was used as the adhesive layer and the other as the outer protective layer.

The present invention provides a polyester coating which is one layer and which is a fused blend of at least two thermoplastic copolyester resins which have different thermal characteristics. Thus it was unexpectedly found that a fused blend of at least two thermoplastic copolyester resins which have different thermal characteristics, i.e., a fused blend of a copolyester having a high glass temperature and a copolyester having a low glass temperature, when coated on a base forms coatings that are superior to coatings of either resin alone or to a true copolyester containing the same units in the same proportions as contained in the blend. The blends used in the invention are blends of thermoplastic copolyester resins having different thermal characteristics that are fusion blended so that the resulting blend is a mixture of the polyester resins comprising the blend.

The invention is illustrated in the following examples:

EXAMPLE 1

One hundred parts by weight of a high molecular weight copolyester of ethylene glycol, neopentyl glycol, terephthalic acid and sebacic acid units in which the ethylene glycol units and neopentyl glycol units were present in the molar ratio of 60:40 and the terephthalic acid units and sebacic acid were present in the molar ratio of 95:5 which had an intrinsic viscosity of 0.624, 3.7 parts of titanium dioxide powder and 1.2 parts by weight of chromium oxide powder were placed in a cold Banbury type mixer and mixed until the resin became plastic and the pigments were thoroughly dispersed throughout the resin. During the mixing period of about 10 minutes the temperature of the resin batch was controlled in the usual manner by passing cold water through the cooling jacket of the mixer so that it ranged from room temperature at the beginning of the mixing to about 135° C. at discharge. When the resin-pigment mixture was discharged from the mixer it was cut into small pieces and cooled.

The cooled pieces of resin were passed into a grinding apparatus and ground to a size small enough to pass a ¼ inch screen. These particles of compounded resin were then ground to a particle size of less than 40 mesh (U.S. Standard screen) in a powder grinder machine.

A layer of the finely powdered pigmented resin was placed in an Armstrong Model C Vibro-Fluidizer apparatus. The resin particles were suspended or fluidized by passing dry air at a rate of 40 cubic feet per hour through the layer of particles. A 3" x 8" 10 gauge steel panel which had been cleaned by grit blasting and vapor degreasing was preheated to 300° C. and immersed in the fluidized bed of resin particles for three seconds and then removed. Resin particles contacted and adhered to the surface of the hot steel panel. The resin particles fused and flowed out forming a smooth coating within half a minute after the coated panel was removed from the coating apparatus. When fusing of the resin particles was complete the hot coated panel was immersed in cold water and cooled to room temperature.

The coating formed was a glossy, light green-colored, hard coating that had fair impact resistance at room temperature. However, the coating becomes more brittle at lower temperatures. The coating had excellent adhesion to metal but showed a tendency to disbond on water immersion, in cathodic salt solution and 5 percent salt fog exposure. The coating had good weatherability and was resistant to mild acid and alkali. The coating had the following physical properties: tensile strength of 7250 pounds per square inch, Shore D hardness of 79, softening point of 165° C., and a dielectric strength of 990 volts per mil.

EXAMPLE 2

A clean steel panel was coated with a tetrachloroethane solution which contained 15 percent by weight of a high molecular weight copolyester of ethylene glycol, neopentyl glycol, terephthalic acid and sebacic acid in which the ethylene glycol units and neopentyl glycol units were present in the molar ratio of 80:20 and the terephthalic acid units and sebacic acid units were present in the molar ratio of 80:20 which had a glass temperature of 23° C., an intrinsic viscosity of 0.775 and a softening point of 151° C. On evaporation of the solvent the coating formed on the metal was clear and soft. It remained tacky at room temperature and was brittle at lower temperatures.

This example is given to provide a coating of a resin having a low glass temperature for comparison with the coating of Example 1. The coating of this example was applied from solution because uniform coatings of soft resins are most readily applied by this process. The test data indicate that although the resin used in this example would not be useful by itself as the sole coating for a base because of its softness at ordinary temperatures and brittleness at low temperature.

EXAMPLE 3

A fusion blend of 70 parts by weight of a 70/30 ethylene terephthalate-neopentyl terephthalate copolyester resin which had a glass temperature of 72° C., an intrinsic viscosity of 0.650 and a softening point of 174° C., 30 parts by weight of a copolyester of ethylene glycol, neopentyl glycol, terephthalic acid and sebacic acid in which the ethylene glycol units and neopentyl glycol units were present in the ratio of 80:20 and the terephthalic acid units and sebacic acid units were present in the ratio of 80:20 which had a glass temperature of 23° C., an intrinsic viscosity of 0.775 and a softening point of 151° C. and 25 parts of titanium dioxide powder was prepared by mixing in a Banbury type mixing apparatus as follows: 70 parts by weight of the 70/30 ethylene terephthalate-neopentyl terephthalate copolyester resin, 30 parts by weight of the ethylene glycol neopentyl glycol terephthalic acid sebacic acid copolyester, 25 parts by weight of titanium dioxide powder were charged into a cold Banbury type mixing apparatus and mixed at a temperature in the range of from room temperature to 135° C. for 10 minutes, discharged from the mixer and ground to a fine powder according to the procedure used in Example 1. A layer of the finely powdered resin compound was placed in an Armstrong Model C Vibro-Fluidizer apparatus and the particles were suspended or fluidized by passing dry air at a rate of 40 cubic feet per hour through the layer of particles, A 3" x 8" 10 gauge steel panel which had been grit blasted and vapor degreased was preheated to 300° C. and immersed in the fluid bed of resin particles for three seconds. Particles of the fusion blended and pigmented resin mixture contacted and adhered to the surface of the hot steel panel. The resin particles fused and flowed out forming a smooth coating within half a minute after the coated panel was removed from the coating apparatus. When the fusing of the resin particles was complete the hot composite panel was immersed in cold water until cooled to room temperature.

The coating formed on the steel panel was a white glossy, tough, impact-resistant coating that had excellent adhesion to the steel substrate. It had good weatherability and showed a very low rate of disbonding on tests such as water immersion, cathodic salt solution testing and 5 percent salt fog exposure. The coating was resistant to mild acid and alkali and had excellent physical properties. The coating had a tensile strength of 7900 pounds per square inch, a Shore D hardness at 25° C. of 83, softening point of 178° C. and a dielectric strength of 850 volts per mil.

EXAMPLE 4

A fine powder of a blend of the copolyester resins used in Example 3 without the titanium dioxide was prepared and coated on a steel panel using the procedure of Example 3. The coating formed was clear, glossy, tough, and had excellent impact resistance and good adhesion to the steel substrate. It had good weatherability and showed a low rate of disbonding in tests such as water immersion, cathodic salt solution and 5 percent salt fog exposure. The coating was resistant to mild acid and alkali and had excellent physical properties. It had a tensile strength of 7600 pounds per square inch, a Shore D hardness at 25° C. of 82, a softening point of 164° C. and a dielectric strength of 1250 volts per mil.

EXAMPLE 5

A fine powder of a blend of 60 parts by weight of an ethylene terephthalate-ethylene isophthalate copolyester which contained 60 percent of ethylene terephthalate and 40 percent of ethylene isophthalate which had a glass temperature of 61° C., an intrinsic viscosity of 0.59 and a softening point of 158° C. with 40 parts by weight of a copolyester of ethylene glycol, terephthalic acid and sebacic acid in which the acid components were present in the ratio of 70 mol percent of terephthalic acid to 30 mol percent of sebacic acid which had a glass temperature of 5.5° C., an intrinsic viscosity of 0.770 and a softening point of 189° C. and 25 parts by weight of titanium dioxide powder was prepared and coated on a steel panel using the procedure of Example 3. The coating formed on the steel panel was a tough, white, impact-resistant coating that had excellent adhesion to the steel substrate. It had good weatherability and showed a low rate of disbonding on tests such as water immersion, cathodic salt solution and 5 percent salt fog exposure. The coating was resistant to mild acid and alkali and had excellent physical properties. It had a tensile strength of 7800 pounds per square inch, a Shore D hardness at 25° C. of 76 and a softening point of 184° C.

EXAMPLE 6

A clean steel panel was preheated to 232° C. and immersed in the same resin powder-titanium dioxide blend in the apparatus as used in Example 3. Particles of the resin blend adhered to the metal surface but did not completely fuse together. The panel was then heated at 232° C. to fuse the resin. When fusion was complete the hot coated panel was allowed to cool. The coating applied by this method had the same properties and characteristics as the coating applied in Example 3.

EXAMPLE 7

A steel panel was heated to 300° C. and immersed in the coating apparatus which contained the resin-titanium dioxide blend used in Example 3. A second steel panel was heated to 300° C. and as the powdered coating fused on the first panel the second hot panel was placed in contact with the molten coating on the first panel and held in place. Both panels were quenched in tap water. An excellent metal to metal adhesive bond was formed by this method.

EXAMPLE 8

A steel panel was coated by heating and pressing it in contact with a dry film of a copolyester resin consisting of 70 mol percent ethylene glycol units, 30 mol percent neopentyl glycol units and 100 mol percent of terephthalic acid units. The copolyester resin of which the film was formed had a glass temperature of 72° C., an intrinsic viscosity of 0.650 and a softening point of 174° C. A clear, hard coating with fair impact resistance was formed on the metal surface. The coating had good adhesion to the metal substrate when dry but tended to disbond upon exposure to high moisture conditions. It had good weatherability and good resistance to mild acid and alkali. The coating had the following physical properties: a tensile strength of 7700 pounds per square inch, Shore D hardness of 80, softening point of 174° C. and a dielectric strength of 3850 volts per mil.

The copolyester resins used in the present invention are linear thermoplastic polymers derived from glycols and organic dicarboxylic acids. Generally the dicarboxylic acid used will be an aromatic dicarboxylic acid or a mixture of an aromatic dicarboxylic acid with an aliphatic dicarboxylic acid. Representative examples of glycols are the polymethylene glycols containing from 2 to 10 methylene groups in the chain, such as ethylene glycol, propylene glycol, butylene glycol, hexamethylene glycol, decamethylene glycol, branched chain glycols, such as 2,2-dimethylpropane diol-1,3; 2 methyl, 2 ethyl propane diol-1,3; glycols containings a cycloaliphatic ring, such as cyclohexane dimethanol, and glycols which contain an aromatic ring, such as 2,2-bis[4(betahydroxy ethoxy) phenyl] propane.

Representative examples of organic dicarboxylic acids are terephthalic acid, isophthalic acid, the naphthalic dicarboxylic acids, such as 1,5; 2,6; and 2,7-naphthalene dicarboxylic acids, bibenzoic acid, and aliphatic dicarboxylic acids, such as adipic acid, azelaic and sebacic acid.

The copolyesters are prepared according to known methods. Thus, they can be prepared by reacting the glycol with a bis ester, such as bis lower alcohol ester of the acid to form the bis glycol ester of the acid or a low polymer thereof, and then condensing this product with the elimination of glycol to form the high molecular weight polyester. The copolyesters can also be prepared by the reaction of the glycols with the free acids to form the bis glycol esters which can be condensed to high molecular weight resins. Usually an ester interchange catalyst, such as zinc acetate and manganese acetate is used. Condensation catalysts, such as lead compounds and antimony compounds are used to promote the condensation reactions.

The blends of copolyester resins used are blends of copolyesters having high glass temperatures with copolyesters having low glass temperatures. The term "glass temperature" as used in this specification is a shortening of the term "glass transition temperature" and is used to mean the temperature at which the solid polymer changes from a glass-like solid state to a state at which it has some flow characteristics. It may also be called the "second order transition temperature." The glass temperature may be determined by determining the specific volume of a small plug of originally amorphous polymer at various temperatures, plotting specific volume against temperature and finding the point of intersection of the two lines drawn through the straight line portions of the curve of the graph of specific volume against temperature. The copolyesters having high glass temperatures have glass temperatures in the range of from about 40° C. to about 120° C. The copolyesters having low glass temperatures have glass temperatures in the range of from about −50° C. to about 40° C. There should be a difference in the glass temperatures of the resins used of at least about 15° C. If desired, several resins can be fused to make a suitable blend, provided the glass temperatures of the resins are within the above range and are suitably different as set out above.

Representative examples of the high molecular weight resins having high glass temperatures are copolyesters, such as ethylene terephthalate-neopentyl terephthalate copolyesters in the range of from 80/20 ethylene terephthalate/neopentyl terephthalate to 20/80 ethylene terephthalate/neopentyl terephthalate, ethylene terephthalate/ethylene isophthalate copolyesters in the range of from 75/25 ethylene terephthalate/ethylene isophthalate to 50/50 ethylene terephthalate/ethylene isophthalate, copolyesters of ethylene glycol, neopentyl glycol, terephthalic acid and isophthalic acid which contain ethylene glycol units and neopentyl glycol units in the molar ratio of from 80/20 to 30/70 and terephthalic acid units and isophthalic acid units in the molar ratio of from 70/30 to 30/70, and other similar copolyester resins. The ethylene terephthalate-neopentyl terephthalate copolyester in the ratio of from 70/30 to 60/40, and the ethylene terephthalate-ethylene isophthalate copolyester in the range of 60/40 to 50/50 have been found to be particularly suitable for use in the resin blends.

Representative examples of the high molecular weight resins having low glass temperatures are copolesters such as copolyesters of ethylene glycol-neopentyl glycol-terephthalic acid-sebacic acid which contain ethylene glycol units and neopentyl glycol units in the molar ratio of from 95/5 to 30/70 and terephthalic acid units and sebacic acid units in the molar ratio of from 95/5 to 60/40, the ethylene terephthalate-ethylene sebacate copolyesters in the range of from 85/15 to 60/40 and other similar resins. The ethylene glycol-neopentyl glycol-terephthalic acid-sebacic acid copolyesters which contain ethylene glycol units and neopentyl glycol units in the molar ratio of from 80/20 to 60/40 and terephthalic acid units to sebacic acid units of from 85/15 to 65/35 and the ethylene terephthalate-ethylene sebacate copolyesters in the range of from 80/20 to 60/40 have been found to be particularly useful in the blends of the invention.

The copolyesters used in the blends are resins of the type that are substantially amorphous and should remain essentially amorphous in the fused blend as well as in the coating apparatus and in the coating after it is applied to the base.

The resin having the higher glass temperature can comprise from about 30 percent to about 95 percent by weight of the resins used in the blend, the remainder of the resin in the blend having the lower glass temperature. Usually the resin having the higher glass temperature will comprise from about 50 to about 90 percent by weight of the resins in the blend. The blends of the 70/30 ethylene terephthalate-neopentyl terephthalate copolymer with the ethylene glycol-neopentyl glycol-terephthalic acid-sebacic acid copolymer in which the molar ratio of ethylene glycol to neopentyl glycol is 80/20 and the molar ratio of terephthalic acid to sebacic acid is 80/20 form excellent coatings when the fused blends contain the ethylene terephthalate-neopentyl terephthalate copolyester in the amount of from about 70 to about 50 percent by weight of the resins in the blend and the ethylene glycol-neopentyl glycol-terephthalic acid-sebacic copolyester in the amount of from about 30 to about 50 percent of the blend. Excellent coatings are also obtained from blends of copolyesters, such as the 60/40 ethylene terephthalate-ethylene isophthalate copolyester with the ethylene terephthalate-ethylene sebacate copolyester when they are blended so that the resins are present in the blend in the range of from 80 to 60 percent by weight of the ethylene terephthalate-ethylene isophthalate copolyester with from 20 to 40 percent by weight of the ethylene terephthalate-ethylene sebacate copolyester resin.

These examples show particular compositions that provide excellent coatings, other copolyester resins and other ratios can be used in those cases where the respective glass temperature of the copolyester resins are in the proper range as set out above. It is obvious the properties of copolyester resins vary with the composition of resins and blends of various resins can be made that will be suitable for use in the invention.

The resin particles used in the Examples 1, 3, and 4–7 were mostly spherical in shape and had a particle size distribution approximately as follows:

99% passed a U.S. 40 standard screen
70% passed a U.S. 80 standard screen
40% passed a U.S. 100 standard screen
20% passed a U.S. 200 standard screen There may be considerable variation in the fineness of the powder used in the powder coating processes. The particle size distribution is not critical for such factors as resin density, particle shape, the desired thickness of the coating applied, and the heat capacity of the article being coated affect the suitability of a resin powder for coating processes. A preferred particle size distribution is as follows:

100% through a No. 60 U.S. standard screen
99% through a No. 100 U.S. standard screen
40% through a No. 200 U.S. standard screen
1% through a No. 325 U.S. standard screen The invention has been illustrated with particular respect to the use of certain resin blends. The ratio of the resins having desired properties may vary over a wide range, suitable from 9 to 30 percent of the resin having a higher glass temperature, and from 5 to 70 percent of resin with the lower glass temperature can be used. While usually a blend of two polyester resins will produce an excellent coating mixture, more than two resins with high, low and intermediate glass temperatures can be used to produce coatings having exceptional toughness and excellent adhesion to metal substrates.

Inert fillers, pigments, and coloring agents can be incorporated in the fused blends, if desired. Titanium dioxide, chromium oxides, finely divided silicas, etc. can be used and can be incorporated in the blends in amounts that vary over a wide range. Up to 50 percent or more by weight of the total weight of the resins in the blends can be used. Generally, the amount incorporated in the blends will be in the range of from about 1 to about 25 percent by weight based on the resins in the blend.

The temperature of application of the resin to the base will vary according to the resins used, the fineness of the powder used, and the heat capacity of the article being coated. The temperature of fusion may range from 125° C. to 315° C. A preferred range of fusion temperatures is in the range of from about 150° C. to 240° C.

The invention has been illustrated particularly with respect to coating and adhesive bonding of polyester resin to steel. Other substances can also be coated and may be in various shapes. Representative examples of materials that can be coated and bonded according to the invention are aluminum, zinc, zinc-coated steel, cast iron, ceramic articles, etc.

The invention has been illustrated with respect to the so-called fluidized bed process. It can also be used in other processes in which fused resin blends are coated onto a base. Thus, the invention can be used in processes, such as processes using conventional flocking or powder spray equipment, and in electrostatic powder spray processes, flame or arc spray processes, and cyclone coating processes.

The testing of the materials shown in the examples above was performed according to standard laboratory methods adopted by the American Society for Testing Materials. The procedures used were as follows: Tensile—ASTM D882–56T Method A; Shore D Hardness ASTM D1484–57T; Softening Point ASTM E28; and Dielectric Strength ASTM D149.

While representative embodiments and details have been shown for the purpose of illustrating the invention, it will be apparent to those skilled in this art that various changes and modifications may be made therein without departing from the spirit or scope of the invention.

What is claimed is:

1. The method of coating an article which comprises forming a suspension of particles of a fused blend of resins, said blend comprising from 95 to 30 percent by weight of a substantially amorphous resin of linear thermoplastic polycondensation product derived from a dicarboxylic acid selected from the group consisting of aromatic dicarboxylic acids and saturated aliphatic dicarboxylic acids and a diol having a glass temperature of from about 40° C. to about 120° C. and from 5 to 70 percent by weight of another resin of a linear substantially amorphous thermoplastic polycondensation product derived from a dicarboxylic acid selected from the group consisting of aromatic dicarboxylic acids and saturated aliphatic dicarboxylic acids and a diol having a glass temperature of from about —50° C. to about 40° C., the difference in the glass temperatures of the two resins being at least 15° C., heating the article to be coated to at least the fusion temperature of the blend, contacting the heated article with the resin particles for a time sufficient for the resin particles to coat and adhere to the article, removing the article from contact with the suspension of resin particles when a coating of the desired thickness of resin is deposited on the article, fusing the coating and cooling the composite article.

2. The method of coating an article which comprises forming a fluidized bed of particles of a fused blend of resins, said blend comprising from 95 to 30 percent by weight of a resin of a linear substantially amorphous thermoplastic polycondensation product derived from a dicarboxylic acid selected from the group consisting of aromatic dicarboxylic acids and saturated aliphatic dicarboxylic acids and a diol having a glass temperature of from about 40° C. to about 120° C. and from 5 to 70 percent by weight of another resin of a linear substantially amorphous thermoplastic polycondensation product derived from a dicarboxylic acid selected from the group consisting of aromatic dicarboxylic acids and saturated aliphatic dicarboxylic acids and a diol having a glass temperature of from about —50° C. to about 40° C., the difference in the glass temperatures of the two resins being at least 15° C., heating the article to be coated to at least the fusion-temperature of the resin blend, moving the heated article through the fluidized bed of resin particles for a time sufficient for the resin particles to coat and adhere the article, removing the article from the fluidized bed when a coating of the desired thickness of resin is deposited on the article, fusing the coating and cooling the composite article.

3. The method of coating an article which comprises forming a fluidized bed of particles of a fused blend of a mixture of from 95 to 30 percent of a 70/30 ethylene terephthalate-neopentyl terephthalate copolyester resin and from 5 to 70 percent of an ethylene glycol-neopentyl glycol-terephthalic acid-sebacic acid copolyester resin in which the ethylene glycol units and the neopentyl glycol units are present in the ratio of 80/20 and the terephthalic acid units and sebacic acid units are present in the ratio of 80/20, heating the article to be coated to at least the fusion temperature of the resin blend, moving the heated article through the fluidized bed of resin particles for a time sufficient for the resin particles to contact and coat the article, removing the article from the fluidized bed when a coating of the desired thickness of resin is deposited on the article, fusing the coating and cooling the composite article.

4. The method of preparing a metal laminate which comprises applying a coating of a composition according to claim 3 to a hot metal surface, contacting the surface of the coating thus applied with a second hot metal surface, pressing, and cooling the composite article.

5. A thermoplastic resin composition for laminating an article by a fusion process which comprises a substantially amorphous fused blend of from 95 to 30 percent by weight of a substantially amorphous thermoplastic copolyester resin polycondensation product derived from a dicarboxylic acid selected from the group consisting of aromatic dicarboxylic acids and saturated aliphatic dicarboxylic acids and a diol which has a glass temperature of at least 40° C. and from 5 to 70 percent by weight of a second substantially amorphous thermoplastic copolyester resin polycondensation product derived from a dicarboxylic acid selected from the group consisting of aromatic dicarboxylic acids and saturated aliphatic dicarboxylic acids and a diol which has a glass temperature between 40° C. and —50° C., the difference between the glass temperature of the two resins being at least 15° C.

6. The composition of claim 5 in which the copolyester resin having a glass temperature of at least 40° C. is selected from the group consisting of (A) ethylene terephthalate-neopentyl terephthalate copolyester resin in which the ratios of ethylene terephthalate units to neopentyl terephthalate units in the copolyester are from 80/20 to 20/80, (B) ethylene terephthalate-ethylene isophthalate copolyester resins in which the ratios of ethylene terephthalate to ethylene isophthalate units in the copolyester are from 75/25 to 50/50 and (C) ethylene glycol-neopentyl glycol-terephthalic acid-isophthalic acid copolyesters in which the ratios of the ethylene glycol units to neopentyl glycol units are from 80/20 to 30/70 and the ratios of the terephthalic acid to isophthalic acid are from 70/30 to 30/70.

7. The composition of claim 5 in which the copolyester resin having a glass temperature below 40° C. is selected from the group consisting of (1) ethylene glycol, neopentyl glycol, terephthalic acid, sebacic acid copolyester resin in which the ratios of ethylene glycol units to neopentyl glycol units are from 95/5 to 30/70 and the ratios of terephthalic acid units to sebacic acid units are 95/5 to 60/40 and (2) ethylene terephthalate-ethylene sebacate copolyesters in which the ratios of ethylene terephthalate to ethylene sebacate are from 85/15 to 60/40.

8. A resin powder for coating an article by a powder-coating process which comprises a powder of a fused blend of a mixture of resins, said mixture comprising from 95 to 30 percent by weight based on the weight of the resin in the blend of a 70/30 ethylene terephthalate-neopentyl terephthalate copolyester and from 5 to 70 percent by weight of an ethylene glycol-neopentyl glycol-terephthalic acid-sebacic acid copolyester in which the ethylene glycol and neopentyl glycol units are present in the ratio of 80/20 and the terephthalic acid units and sebacic acid units are present in the ratio of 80/20.

References Cited

UNITED STATES PATENTS

| | | | |
|---|---|---|---|
| 2,623,031 | 12/1952 | Snyder | 260—860 |
| 2,876,725 | 3/1959 | Buck et al. | 113—120 |
| 3,090,772 | 5/1963 | Crowell | 156—332 |
| 3,078,249 | 2/1957 | Russell | 260—860 |
| 3,106,769 | 10/1963 | Goether et al. | 117—21 |
| 3,136,677 | 6/1964 | Woker | 260—75 |

FOREIGN PATENTS 877,539  9/1961  Great Britain.

MURRAY TILLMAN, *Primary Examiner.*

J. T. GOOLKASIAN, *Assistant Examiner.*